United States Patent [19]

Earl

[11] Patent Number: 4,622,944
[45] Date of Patent: * Nov. 18, 1986

[54] FUEL EVAPORATION APPARATUS AND METHOD

[76] Inventor: Gregory Earl, 4005 Saul Rd., Kensington, Md. 20895

[*] Notice: The portion of the term of this patent subsequent to Sep. 3, 2002 has been disclaimed.

[21] Appl. No.: 761,170

[22] Filed: Aug. 1, 1985

Related U.S. Application Data

[63] Continuation-in-part of Ser. No. 639,315, Aug. 10, 1984, Pat. No. 4,538,583.

[51] Int. Cl.4 .......................................... F02M 31/02
[52] U.S. Cl. ................................. 123/557; 123/558; 123/549
[58] Field of Search ............... 123/557, 558, 523, 549, 123/545; 261/142, 144, 145, DIG. 8

[56] References Cited

U.S. PATENT DOCUMENTS

| 541,773 | 4/1895 | Mead | 123/557 |
|---|---|---|---|
| 1,465,574 | 8/1923 | Bannister | 123/523 |
| 1,603,660 | 10/1926 | Cassella | 123/557 |
| 1,608,018 | 11/1926 | Eldred | 123/557 |
| 1,980,496 | 11/1934 | Musselwhite | 261/13 |
| 1,997,497 | 5/1935 | Pogue | 261/16 |
| 2,049,687 | 8/1936 | Chamberlain | 261/15 |
| 2,219,522 | 10/1940 | Hinsch | 48/103 |
| 2,306,897 | 12/1942 | Ollig | 48/107 |
| 2,650,582 | 9/1953 | Green | 261/DIG. 83 |
| 3,872,191 | 3/1975 | Walcker | 261/145 |
| 3,886,919 | 6/1975 | Freeman | 123/558 |
| 3,916,859 | 11/1975 | Fossum | 123/545 |
| 3,961,616 | 6/1976 | Brown | 123/545 |
| 4,015,569 | 5/1977 | Leshner et al. | 123/558 |
| 4,106,457 | 8/1978 | Totten et al. | 123/558 |
| 4,112,889 | 9/1978 | Harpman | 123/25 B |
| 4,139,582 | 2/1979 | Collins | 261/51 |
| 4,151,821 | 5/1979 | Wichman et al. | 123/558 |
| 4,212,274 | 6/1980 | Quick | 123/548 |
| 4,213,433 | 7/1980 | Day | 123/549 |
| 4,223,652 | 9/1980 | Budnicki | 123/440 |
| 4,349,001 | 9/1982 | Wagner | 123/557 |
| 4,350,134 | 9/1982 | Sparks | 123/557 |

FOREIGN PATENT DOCUMENTS

| 490266 | 4/1919 | France | 123/545 |
|---|---|---|---|
| 58-2462 | 8/1983 | Japan | 123/557 |

Primary Examiner—E. Rollins Cross
Attorney, Agent, or Firm—Sherman & Shalloway

[57] ABSTRACT

This device relates to a novel system for supplying fuel to an internal combustion engine. The system includes a two-stage evaporator serially mounted within the fuel supply system of the internal combustion engine. The evaporator includes a first stage having fuel supply orifices to inject fuel at the top of a chamber in which are mounted a pair of spaced thermal discs having numerous holes therethrough. The evaporated fuel is then conducted to the second stage of the evaporator where it is further expanded in a spiral tube heated by, for example, exhaust gases and then conducted to a venturi stack via a vapor control regulator valve and fuel supply manifold to the intake manifold of the internal combustion engine. Use of the system results in increased gas mileage as the high degree of vaporization of the fuel results in a much greater efficiency in the burning thereof.

12 Claims, 5 Drawing Figures

FUEL EVAPORATION APPARATUS AND METHOD

BACKGROUND OF THE INVENTION

This application is a Continuation In Part of Application Ser. No. 06/639,315, filed Aug. 10, 1984, now U.S. Pat. No. 4,538,583, which is hereby incorporated herein by reference.

Since the advent of the internal combustion engine, various attempts have been made to provide a fuel supply system which increases the efficiency of the burning of the fuel. Applicant is aware of several United States Patents which are generally directed to this subject matter as follows:

U.S. Pat. No. 541,773 to Mead.
U.S. Pat. No. 1,465,574 to Bannister.
U.S. Pat. No. 1,603,660 to Cassella.
U.S. Pat. No. 1,980,496 to Musselwhite.
U.S. Pat. No. 1,608,018 to Eldred.
U.S. Pat. No. 1,997,497 to Pogue.
U.S. Pat. No. 2,049,687 to Chamberland, et al.
U.S. Pat. No. 2,219,522 to Hinsch.
U.S. Pat. No. 2,306,897 to Ollig.
U.S. Pat. No. 2,650,582 to Green.
U.S. Pat. No. 3,872,191 to Walcker.
U.S. Pat. No. 3,886,919 to Freeman.
U.S. Pat. No. 3,916,859 to Fossum.
U.S. Pat. No. 3,961,616 to Brown.
U.S. Pat. No. 4,015,569 to Leshner, et al.
U.S. Pat. No. 4,106,457 to Totten, et al.
U.S. Pat. No. 4,112,889 to Harpman.
U.S. Pat. No. 4,139,582 to Collins.
U.S. Pat. No. 4,151,821 to Wichman, et al.
U.S. Pat. No. 4,212,274 to Quick.
U.S. Pat. No. 4,213,433 to Day.
U.S. Pat. No. 4,223,652 to Budnicki.
U.S. Pat. No. 4,349,001 to Wagner.
U.S. Pat. No. 4,350,134 to Sparks.
French Pat. No. 490,266 to Feroldi.
Japanese Pat. No. 582,462 to Takafumi.

While some of these patents teach some of the aspects of the present invention, Applicant believes that none of them teach, either singly or in combination, all of the invention features combined into Applicant's invention.

SUMMARY OF THE INVENTION

The invention disclosed herein includes a plurality of separate components combined together to form a fuel supply system for an internal combustion engine. Fuel is conducted to a two-stage evaporator. A first stage of this evaporator includes a manifold for supplying the fuel to a chamber via a plurality of micro-pores. In the chamber, in the preferred embodiment, a pair of thermal discs are mounted in spaced relationship. Each thermal disc has a plurality of holes extending axially therethrough and includes a plurality of heating elements which serve to heat the thermal discs to a predetermined controlled temperature. As the fuel exits the above described micro-pores, it is partially atomized by the size of the micro-pores. The fuel, after exiting the micro-pores, impinges upon the thermal disc to thereby be vaporized and may also flow through the above described holes for further evaporation. As the fuel vaporizes, the chamber fills with vaporized fuel which then enters the second stage of the evaporator in accordance with the present invention.

The second stage of the improved fuel evaporator comprises, in the preferred embodiment, a second chamber concentrically arranged with respect to the above described chamber. In this second chamber, an elongated conduit is provided in a spiral configuration winding around the circumference while traversing from an inlet at the top of the second chamber to an outlet at the bottom of the second chamber. Within this second chamber, pores are also provided for supply and exhaust of, for example, exhaust fumes from the operation of the internal combustion engine, which are used in order to heat the fuel within the spiral conduit.

After the vaporized fuel has been further heated and further expanded within the spiral conduit, the now completely vaporized fuel exits the spiral conduit at the bottom thereof via an outlet fitting. This fitting conducts the vaporized fuel to a vapor control regulator comprising an orifice adjustable for the desired flow rate. The vapor control regulator is fluidly connected with a manifold containing vapor control valves which control the admission of vaporized fuel to the venturi stack responsive to movement of the accelerator pedal (not shown). The engine itself acts as the pump, sucking the vapors into the venturi stack when the vapor control valves are open.

The improved fuel evaporation process disclosed herein includes other features which are necesasry in the particular applications to which such a device will be put. For example, cold start valves are provided which directly supply fuel from the fuel tank to the venturi stack for cold starting purposes. Further, idle adjustment devices are provided which enable the adjustment of the operation speed of the engine during idle.

Accordingly, it is a first object of the present invention to provide an improved fuel supply system for an internal combustion engine.

It is a further object of the present invention to provide a fuel supply system for an internal combustion engine which increases the efficiency in the burning of the fuel-air mixture thereof.

It is a still further object of the present invention to increase the efficiency of the burning of fuel in an internal combustion engine through the use of a two-stage evaporator system which completely evaporates and expands the fuel before it is mixed with air.

It is a yet further object of the present invention to provide the evaporator system with unique thermal discs having holes therethrough which enable the efficient evaporation of the fuel in a first stage thereof.

It is a yet further object of the present invention to provide, in a second stage thereof, a spirally configured conduit heated by, for example, exhaust gases as a second stage of the evaporator which second stage feeds vapor to the venturi stacks of the associated engine via a vapor control regulator and vapor control valves.

There and other objects, advantages and features of the present invention will become apparent from the following detailed description of the preferred embodiments when considered in conjunction with the accompanying drawings.

SPECIFIC DESCRIPTION OF THE PREFERRED EMBODIMENTS

Figure 1:
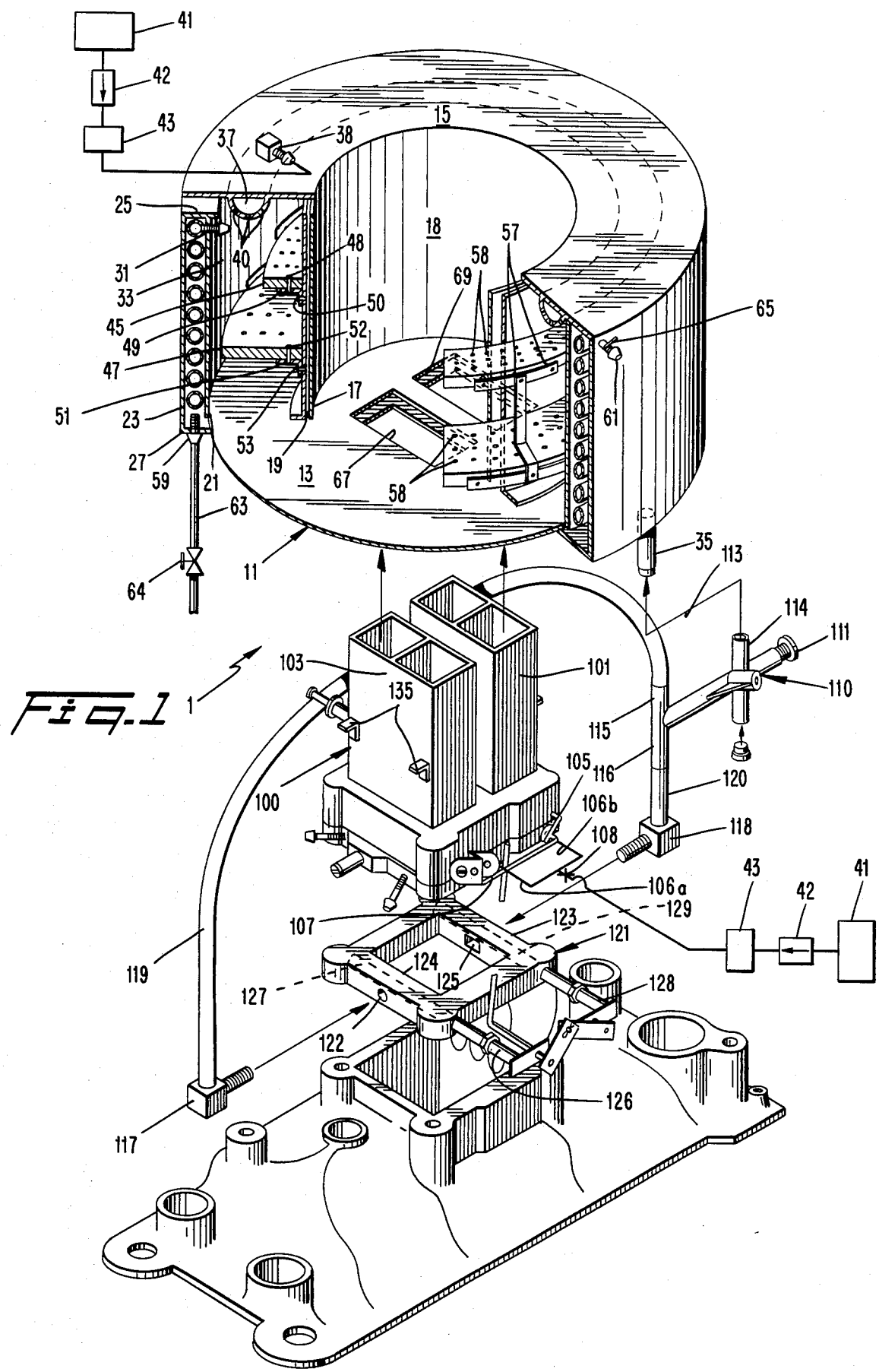
FIG. 1 shows a perspective exploded view of a preferred embodiment of the present invention wih portions broken away to show detail.

With reference, now, to FIG. 1, the improved fuel evaporator apparatus 1 is seen in exploded perspective view. The apparatus includes a two-stage evaporator section 10 and a venturi-fuel block section 100. The two-stage evaporator section 10 includes a housing 11 including a bottom plate 13, a top plate 15 and four substantially concentric, substantially cylindrical walls 17, 19, 21 and 23 disposed substantially perpendicularly between the bottom and upper plates 13 and 15. The wall 17 defines therewithin a chamber 18 into which portions of the venturi-fuel block 10 protrude and into which an air cleaner (not shown) may be mounted.

The wall 21 is located at substantially the periphery of the bottom plate 13 and defines along with the wall 23 and top and bottom walls 25, 27 a chamber 22 in which a spiral conduit 29 is mounted. The wall 23 is slightly longer than the wall 21 so that the bottom wall 27 is slightly below the bottom plate 13 as shown in FIG. 1. The bottom wall 27 extends parallel to the bottom plate 13 so as to define therebetween a portion of the chamber 22 which allows exhaust gases therein to heat the bottom plate 13 and thereby any unvaporized fuel impinging thereon in the chamber 33. The spiral conduit 29 is provided with an inlet fitting 31 which protrudes into a chamber 33 defined between the walls 19 and 21 and is further provided with an outlet fitting 35 which may, if desired, protrude through the bottom wall 27 of the chamber 22.

The top plate 15 is connected with the wall 17 as seen in FIG. 1, while the wall 19 is attached to the bottom plate 13 along with the wall 21. The top plate 15 includes extending downwardly therefrom an annular chamber 37 formed by a wall structure 39. An inlet fitting 38 connects this chamber 37 with the fuel tank 41 via the fuel pump 42 and fuel filter 43. The wall structure 39 includes a plurality of micro-openings 40 which communicate the chamber 37 with the chamber 33 for a purpose to be described hereinafter.

As further shown in FIG. 1, the wall 19 has mounted thereon a pair of thermal discs 45 and 47. As shown the thermal disc 45 extends slightly less than halfway radially across the chamber 33 and is connected to the wall 19 by an angular member 49 and suitable fastening means 48 and 50. The thermal disc 47 extends almost entirely across the radial extent of the chamber 33 and is attached to the wall 19 by angular member 51 and suitable fastening means 52 and 53. At spaced positions throughout the circumferential extent of the respective thermal discs 45 and 47, radial holes 55 are formed therein. Each hole 55 is dimensioned to snugly receive therein a heating element 57 which may, if desired, comprise a glow plug. The details of the electrical connection of the heating elements 57 into the electrical system of the vehicle will be be described in greater detail hereinafter with reference to FIG. 3. Further, each thermal disc includes a plurality of holes 58 extending axially therethrough which increase the surface area for heat transfer of the thermal discs 45 and 47 and allow fuel to flow therethrough, thereby promoting more complete vaporization thereof.

Figure 4:
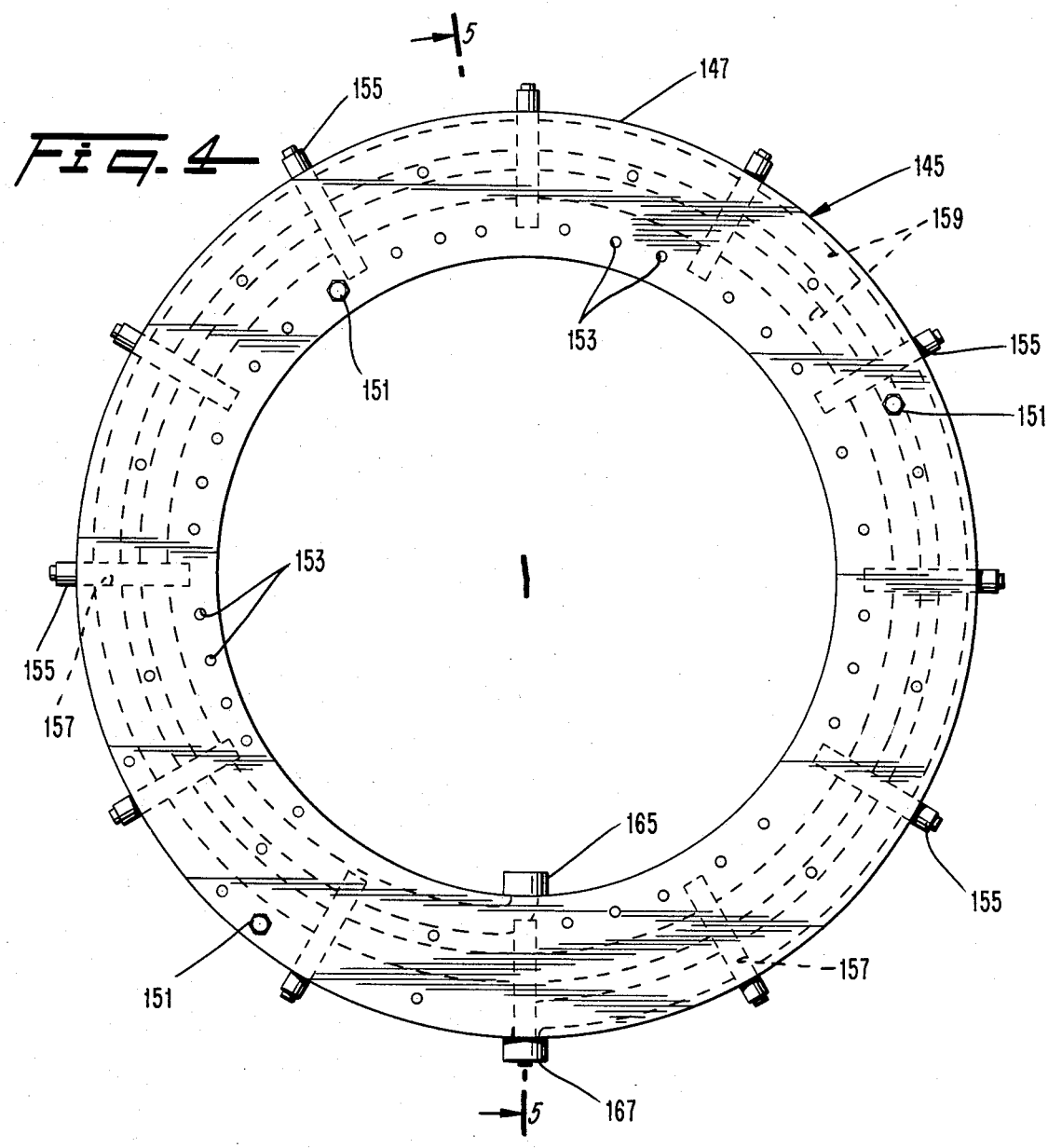
FIG. 4 shows a top view of a modified thermal disc.
Figure 5:
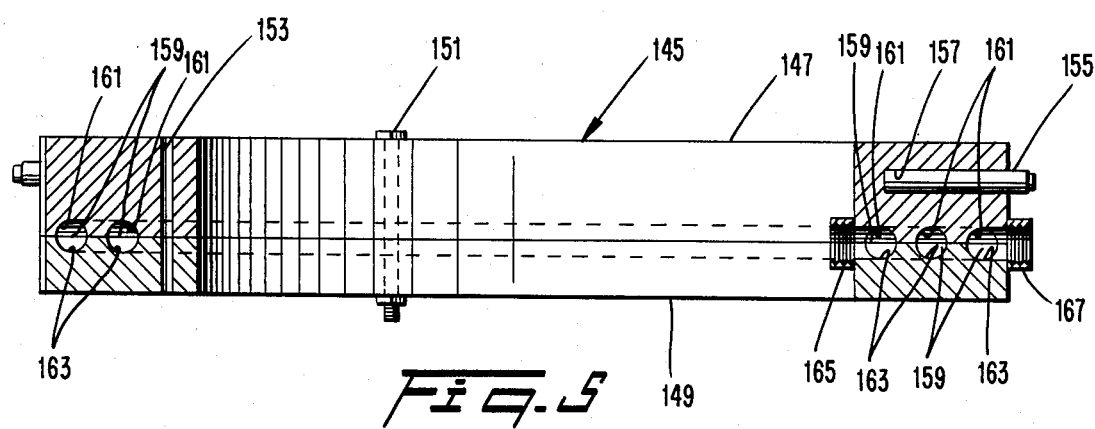
FIG. 5 shows a cross-sectional view along the line 5—5 of FIG. 4.

An alternative construction of the thermal discs is seen with reference to FIGS. 4–5. Therein a thermal disc 145 is seen to be comprised of a top half 147 and a bottom half 149 mounted together as with bolts 151. When so mounted together, the disc 145 includes holes 153 therethrough for the same purpose as the above described holes 58 and has mounted thereto heating elements 155 which are inserted into holes 157.

When the halves 147 and 149 are assembled together, as best seen in FIG. 5, a continuous channel 159 is formed which as best seen in FIG. 4 is spiral-like in configuration and made up of half channels 161 and 163.

The channel 159 includes ports 165 and 167 which convey a heating medium such as, for example, exhaust gases to and from the channel 159. Thus the channel 159 provides a heat source which augments the heat provided to the disc 145 by heating elements 155.

Figure 2:
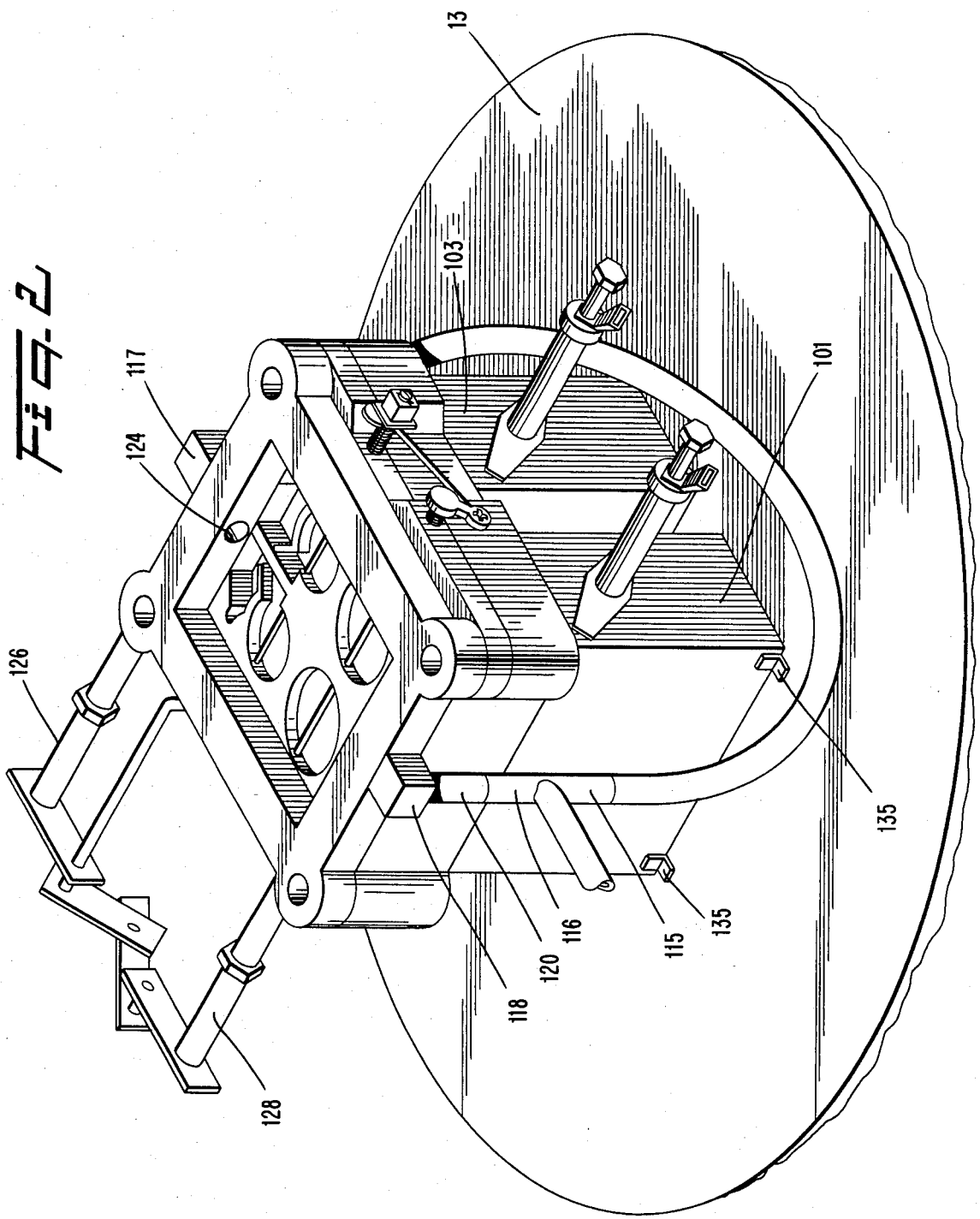
FIG. 2 shows a further perspective view of the present invention taken from a different orientation from that of FIG. 1.
Figure 3:
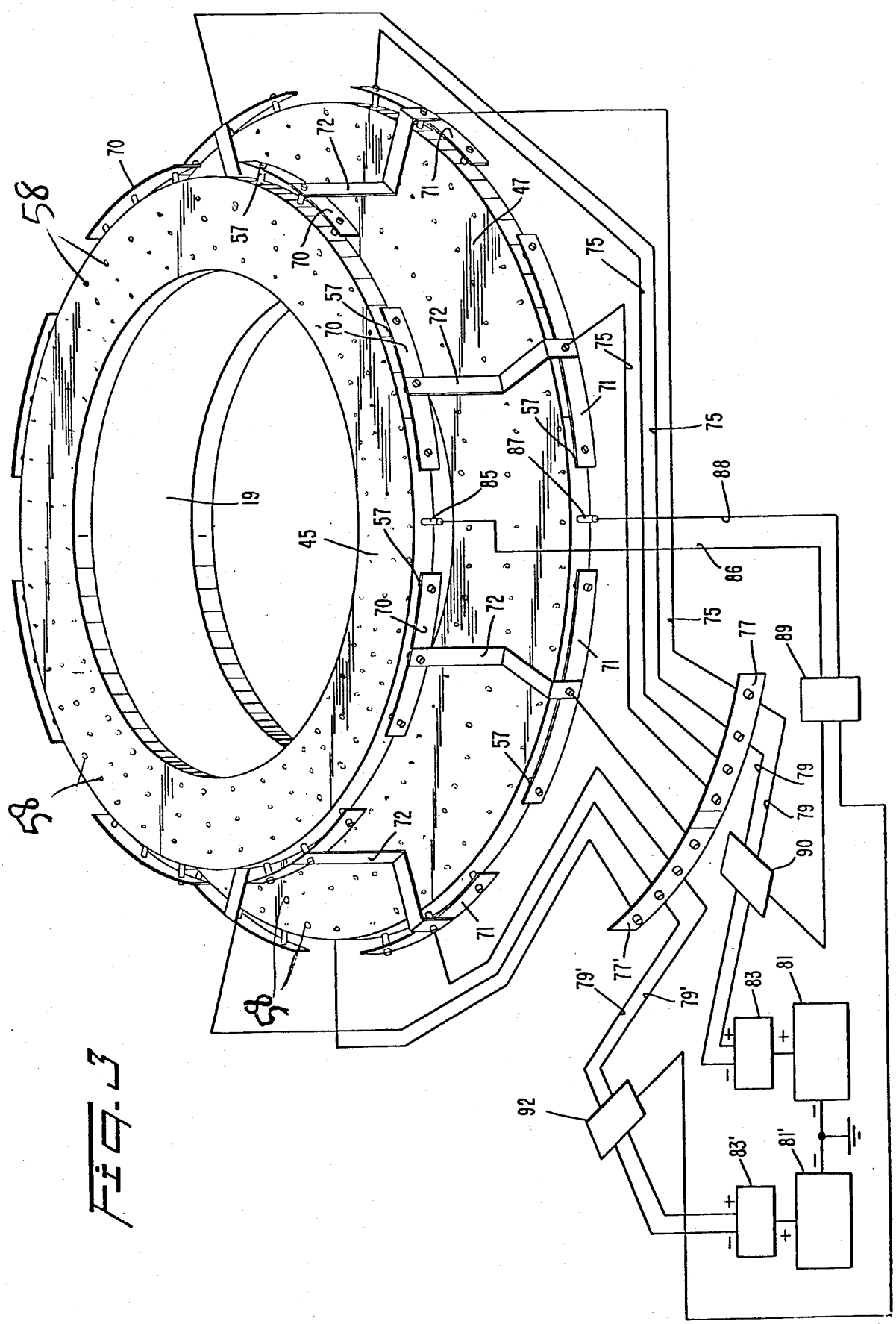
FIG. 3 shows a perspective view of the structure of the thermal discs and their electrical connections in one preferred form thereof.

The disc 145 as depicted in FIGS. 4–5 may, of course, be structured and sized so as to replace either of the discs 45 or 47 shown in FIGS. 1–3. Further, if desired, the channel 159 may include a temperature sensor therein which senses the temperature of heating medium therein and the system may include means responsive to the sensed temperature which controls the admission of heating medium to the channel 159. Similar sensor and control structure is shown in FIG. 1 and designated by reference numerals 65 and 64. Alternatively or concurrently, the disc 145 may have the temperature sensing and control means designated in FIG. 3 with reference numerals 85, 87, 89, 90 and 92. Further, in the modification shown in FIGS. 4–5, the heating elements 155 may be connected into an electrical circuit in the same manner as the elements 57 as shown in FIG. 3.

As noted above, the chamber 22 is provided for the purpose of containing exhaust gases conveyed therein for the purpose of heating the spiral conduit 29 and vapors contained therein, as well as for heating the bottom of plate 13, as well as any unvaporized fuel impinging thereon within chamber 33. In order to convey exhaust fumes into the chamber 22, an inlet fitting 59 is provided and outlet fitting 61 is provided so as to enable the conveyance of exhaust fumes away from the chamber 22 as deisred. The inlet fitting 59 has connected thereto a conduit 63 having a valve 64 therein. The outlet fitting 61 includes a temperature sensor 65. If desired, the temperature sensor 65 may be inter-connected with the valve 64 so that the temperature at the outlet fitting 61 of the exhaust fumes may be sensed and from this sensed temperature, the inlet valve 64 for the exhaust fumes may be suitably controlled so as to control the temperature to which fuel vapors within the spiral conduit 29 are exposed.

As further shown in FIG. 1, the bottom plate 13 of the evaporator portion 10 includes a pair of rectangular holes 67 and 69 therethrough. These holes are provided so as to enable the venturi stacks of the venturi-fuel block portion 100 of the invention to protrude therethrough in assembly. As also shown in FIG. 1, the bottom wall 27 has similar rectangular holes aligned with the holes 67 and 69 and provided for the same purpose. As shown in FIG. 1, the venturi-fuel block section 100 includes a primary venturi stack 101 which fits through the opening 69 in the plate 13 of the evaporator 10 and a secondary venturi stack 103 which fits through the opening 67 in the plate 13 of the evaporator 10, as well as through the holes in bottom wall 27. As shown, the venturi stacks 101 and 103 have extending therethrough respective cold start valves 105 and 107 which connect directly to the vehicle fuel tank 41 via the pump 42, filter 43 and the conduit 106 including branches 106a and 106b. The cold start valves 105 and 107 are provided for the purpose of enabling the engine to be started in cold weather and when it has not been used for a long period of time. Accordingly, the cold start valves 105 and 107 are only intended to be used for starting the engine and the fuel supply valve 108 located in the line 106 may be shut off either automatically or manually after starting of the engine has been accomplished.

With further reference to FIG. 1, it is seen that the apparatus 100 further includes a vapor control regulator 110 which comprises an orifice the size of which is adjustable by rotation of the screw actuator 111. The regulator 110 is connected to the outlet fitting 35 via the line 113 and regulator input port 114. The regulator 110 further includes two output ports 115, 116 which fluidly connect with the fittings 117, 118 via conduits 119, 120. The fittings 117, 118 fluidly connect the respective conduits 119, 120 with a manifold 121 via respective ports 122, 123. Port 122 communicates with venturi stack 103 via port 124, while port 123 communicates with venturi stack 101 via port 125. Flow of vapors between ports 122 and 124 is controlled by valve 126 which includes flat portion 127 the rotative position of which controls the flow between ports 122 and 124. In a similar fashion, flow of vapors between ports 123 and 125 is controlled by valve 128 which includes flat portion 129, the rotative position of which controls the flow between ports 123 and 125. The position of valves 126 and 128 is controlled by the vehicle accelerator pedal (not shown).

Also mounted to the venturi stacks 101 and 103 are a plurality of bracket members 135 which are provided so as to enable the correct alignment of the venturi-fuel block apparatus 100 with the evaporator apparatus 10 during the assembly thereof. With further reference, now, to FIG. 2, it is seen that the venturi stacks 101 and 103 are mounted on a base member 137 which contains the respective valves therein. Mounted at the bottom of the primary venturi stack 101 are a pair of primary valves 139 while mounted at the bottom of the secondary venturi stack 103 are a pair of secondary valves 141. A linkage 143 is shown mounted on the side of the plate 145 and this linkage 143 is connected to control structure well known to those skilled in the art which is utilized to operate the valves 139 and 141 to thereby control the flow of air therethrough which is mixed with fuel vapor entrained therein.

With reference now to FIG. 3, the electrical connections for the heating elements 57 will now be described in greater detail. FIG. 3 shows the thermal discs 45 and 47 as mounted to the wall 19 with the holes 58 therethrough. In the preferred arrangement of electrically connecting the glow plugs 57 with batteries 81 and 81', the glow plugs 57 are connected together in groups of six glow plugs with three glow plugs in this group being located in the thermal disc 45 and the other three in this group of six being located in the thermal disc 47. As shown in FIG. 3, each group of six glow plugs includes a first electrical conductor 70 which commonly connects together the glow plugs 57 located in the thermal disc 45. The group further includes an electrical conductor 71 which electrically connects together the glow plugs 57 located within thermal disc 47. A further electrical conductor 72 electrically interconnects the electrical conductors 70 and 71. An electrical wire 75 is connected at a location somewhere on one of the electrical conductors 70, 71 and 72 and connects with a junction box 77 or 77' as shown. As such, in the embodiment shown in FIG. 3, the electrical junction box 77 includes four electrical wires 75 connected thereto to thereby enable the control of 24 glow plugs 57 while the electrical junction box 77' has connected thereto four wires 75 so as to enable the control thereby of twenty-four further glow plugs 57. The electrical junction box 77 is connected to the battery 81 via electrical conductors 79 which connect to the terminal section 83, whereas the battery 81' is connected to the electrical junction box 77' via electrical conductors 79' which connect to the electrical terminals located at 83'.

As further shown in FIG. 3, the thermal disc 45 may have a temperature sensor 85 mounted thereto while the thermal disc 47 may have a temperature sensor 87 mounted thereto. These temperature sensors 85 and 87 connect to a control box 89 via electrical wires 86 and 88, respectively. The control box 89 is electrically connected to electrical switches 9 and 92 which respectively control the electrical current through electrical wires 79 and 79'. Accordingly, the control box 89 may be programmed in a manner well known to those skilled in the art so as to enable the sensing of the temperature of thermal discs 45 and 47 and when this temperature exceeds a predetermined desired temperature, causing the opening of the switches 90 and 92. When the temperature of the thermal discs 45 and 47 reduces below a predetermined temperature, the control box 89 senses this via the temperature sensors 85 and 87 and acts to close the switches 90 and 92 to thereby enable the heating of the thermal discs 45 and 47 by the glow plugs 57.

Now, the operation of the present invention will be described with reference to FIGS. 1–3. As noted above, fuel is supplied to the trough 37 from the fuel reservoir 41 via the fuel pump 42, filter 43 and inlet fitting 38. The pressure provided by the fuel pump 42 acts to force the fuel out of the micro-pores 40 in the trough 37 in a fine, mist-like spray. The thermal discs 45 and 47 having been heated by the glow plugs 57, fuel impinging thereon and flowing through the holes 58 vaporizes. Further, fuel impinging upon the wall 21 of the chamber 22 is also heated and vaporizes due to the presence of exhaust fumes within the chamber 22 which act to heat the wall 21. The suction created by the fuel demand at the venturi stacks 101 and 103 causes the fuel vapor to be sucked into the port 31 and to then flow through the spiral conduit 29 wherein the fuel vapor is further heated through the above noted presence of exhaust fumes within the chamber 22. After traversing the spiral conduit 29, the fuel exits the spiral conduit 29 via the fitting 35 and progresses to the vapor control regulator 110 via the conduit 113.

Vaporized fuel enters the vapor control regulator 110 and is conveyed to the orifice via port 114 and thence to the outlet ports 115 and 116 which respectively supply the vapor control valves 126 and 128 located in manifold 121 on respective secondary and primary venturi stacks 103 and 101 via conduits 119, 120 and fittings 117 and 118. The valves 139 and 141 are controlled in a manner known to those skilled in the art to thereby control the flow of air through the venturi stacks 101 and 103 and to thereby entrain into the air flow, fuel vapors which have been conveyed to vapor control valves 126 and 128.

When the engine has not been used for long period of time, or, for example, on cold mornings, the cold start valves 105 and 107 may be utilized through the control of the valve 108 to supply fuel directly to the venturi stacks bypassing the evaporator 10. As noted hereinabove, the valve 108 may be controlled by a timer or by a temperature sensor or other means so as to cut off the supply of fuel to the valves 105 and 107 after the engine has sufficiently warmed up.

The flow of exhaust gases through the chamber 22 is controlled by the temperature sensor 65 which senses the temperature and acts through the control means (not shown) to control the opening and closing of the valve 64 so as to control the flow of exhaust gases in the chamber 22. Similarly, as best seen in FIG. 3, the temperature sensors 85 and 87 located in the respective thermal discs 45 and 47 sense the temperatures thereof and send signals indicative of the temperatures to a control box 89 which acts to control the flow of current to the glow plugs 57 to thereby control the temperature of the thermal discs 45 and 47 to a desired temperature range.

Accordingly, an improved fuel supply system for an internal combustion engine has been disclosed which fulfills each and every object delineated hereinabove. It is contemplated that various modifications, alterations and changes in the teachings of the present invention may occur to those skilled in the art. Accordingly, it is intended that the invention should not be limited to the embodiments specifically described herein, but rather that the invention disclosed herein should only be limited by the scope of the appended claims.

I claim:

1. An evaporator apparatus for use in the fuel supply system of an internal combustion engine, comprising:
   (a) housing means including an opening closed by removable cover means;
   (b) inlet means for admission of fuel to chamber means, said inlet means comprising pore means provided at spaced locations about said chamber means;
   (c) thermal disc means mounted in said chamber means, said thermal disc means being controllably heated whereby fuel from said inlet means impinging upon said thermal disc means is vaporized, said thermal disc means including a plruality of holes each extending completely therethrough;
   (d) outlet means for evacuating vaporized fuel from said chamber means; and
   (e) said cover means defining a trough having an inlet port connectable to a supply of fuel, said pore means communicating said trough with said chamber means.

2. The invention of claim 1, wherein said thermal disc means comprises a first thermal disc and a second thermal disc, said first thermal disc having a width approximately one-half the width of said second thermal disc, each said thermal disc having a plurality of said holes each extending completely therethrough.

3. The invention of claim 2, wherein said first thermal disc is mounted in said chamber means closer to said inlet means than said second thermal disc, and each said thermal disc includes:
   (a) a plurality of further holes extending radially therein;
   (b) a heating element mounted in each said further hole, and
   (c) said heating elements being controllably connected to a source of electrical current.

4. The invention of claim 3, wherein each said thermal disc includes temperature sensor means connected to controller means, said controller means controlling the flow of electrical current to said heating elements.

5. The invention of claim 1, wherein said outlet means communicates with a spiral conduit contained within further chamber means, said spiral conduit having further outlet means conveying said vaporized fuel in said spiral conduit out of said further chamber means.

6. The invention of claim 5, wherein said further chamber means includes:
   (a) an inlet;
   (b) an outlet;
   (c) means supplying engine exhaust fumes to said inlet; and
   (d) means exhausting engine exhaust fumes from said outlet.

7. The invention of claim 6, wherein said inlet includes valve means and said outlet includes temperature sensor means connected to control means, said control means controlling said valve means responsive to the temperature at said outlet.

8. The invention of claim 5, wherein said further outlet means conveys vaporized fuel to a vapor control regulator including an adjustable orifice therein, said vapor control regulator supplying said vaporized fuel to a manifold.

9. The invention of claim 8, wherein said manifold supplies said vaporized fuel to venturi stack means of a carburetor of said engine.

10. A method of vaporizing fuel comprising the steps of:
   (a) conveying said fuel to a trough under pressure, said trough being located on a cover means removably attached to a housing defining chamber means, said cover means closing an opening in said housing;
   (b) atomizing said fuel by forcing said fuel through a plurality of pore means located in said trough;
   (c) impinging said atomized fuel onto a heated surface within said chamber means which at least partially vaporizes said fuel, said heated surface having a plurality of holes each extending completely therethrough;
   (d) conveying said fuel in heat exhange relationship with engine exhaust fumes; and
   (e) conveying said fuel to a carburetor of said engine in completely vaporized condition.

11. An evaporator apparatus for use in the fuel supply system of an internal combustion engine, comprising:
   (a) housing means including an opening closed by removable cover means;
   (b) inlet means for admission of fuel to chamber means, said inlet means comprising pore means provided at spaced locations about said chamber means;
   (c) thermal disc means mounted in said chamber means, said thermal disc means being controllably heated whereby fuel from said inlet means impinging upon said thermal disc means is vaporized;
   (d) outlet means for evacuating vaporized fuel from said chamber means, said outlet means supplying fuel to a carburetor of said engine via a vapor control regulator having an adjustable orifice therein and a manifold having at least one vapor control valve therein; and (e) said cover means defining a trough having an inlet port connectable to a supply of fuel, said pore means communicating said trough with said chamber means.

12. A method of vaporizing fuel comprising the steps of:

(a) conveying said fuel to a trough under pressure, said trough being located on a cover means removably attached to a housing defining chamber means, said cover means closing an opening in said housing;

(b) atomizing said fuel by forcing said fuel through a plurality of pore means located in said trough;

(c) impinging said atomized fuel onto a heated surface within said chamber means which at least partially vaporized said fuel;

(d) conveying said fuel in heat exchange relationship with engine exhaust fumes; and (e) conveying said fuel to a carburetor of said engine in completely vaporized condition via a vapor control regulator having an adjustable orifice therein and a manifold having at least one vapor control valve therein.

* * * * *